US008051832B2

(12) United States Patent
Hotta et al.

(10) Patent No.: US 8,051,832 B2
(45) Date of Patent: Nov. 8, 2011

(54) AIR INTAKE CONTROL SYSTEM FOR INTERNAL COMBUSTION ENGINE OF A VEHICLE

(75) Inventors: Kazuhito Hotta, Saitama (JP); Takeru Abe, Saitama (JP); Masanobu Urabe, Saitama (JP); Takaaki Tsukui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 408 days.

(21) Appl. No.: 11/905,118

(22) Filed: Sep. 27, 2007

(65) Prior Publication Data

US 2008/0078357 A1   Apr. 3, 2008

(30) Foreign Application Priority Data

Sep. 29, 2006   (JP) ................. 2006-269405

(51) Int. Cl.
*F02D 9/08* (2006.01)
(52) U.S. Cl. ........................ 123/399; 123/403
(58) Field of Classification Search .............. 123/336, 123/342, 361, 396, 399, 296, 308, 337, 400, 123/403, 432, 443; 251/129.11; 180/170, 180/219
See application file for complete search history.

(56) References Cited

U.S. PATENT DOCUMENTS

| | | | | |
|---|---|---|---|---|
| 5,868,114 A * | 2/1999 | Kamimura et al. | ........... | 123/399 |
| 6,039,027 A * | 3/2000 | Sato et al. | ........... | 123/399 |
| 6,415,765 B1 * | 7/2002 | Akagi et al. | ........... | 123/336 |
| 7,168,517 B2 * | 1/2007 | Udono | ........... | 180/219 |
| 2004/0194757 A1 * | 10/2004 | Irihune et al. | ........... | 123/399 |
| 2005/0045147 A1 * | 3/2005 | Ishikawa et al. | ........... | 123/336 |
| 2005/0279325 A1 * | 12/2005 | Suzuki | ........... | 123/399 |
| 2006/0112930 A1 * | 6/2006 | Matsuda et al. | ........... | 123/399 |
| 2006/0157027 A1 * | 7/2006 | Ichikawa et al. | ........... | 123/399 |
| 2006/0266329 A1 * | 11/2006 | Irihune et al. | ........... | 123/399 |
| 2009/0314231 A1 * | 12/2009 | Kontani et al. | ........... | 123/54.4 |

FOREIGN PATENT DOCUMENTS

| | | |
|---|---|---|
| JP | 1-232125 A | 9/1989 |
| JP | 2001-90557 A | 4/2001 |
| JP | 2002-96761 A | 4/2002 |
| JP | 2002-256900 A | 9/2002 |
| JP | 2003-74383 A | 3/2003 |
| JP | 3536612 B2 | 3/2004 |
| JP | 2004-124873 A | 4/2004 |
| JP | 2005-16437 A | 1/2005 |
| JP | 2005-90267 A | 4/2005 |
| JP | 2005-337206 A | 12/2005 |
| JP | 2006-17080 A | 1/2006 |

* cited by examiner

*Primary Examiner* — John Kwon
*Assistant Examiner* — Johnny Hoang
(74) *Attorney, Agent, or Firm* — Birch, Stewart, Kolasch & Birch, LLP

(57) ABSTRACT

An air intake control system is provided for an internal combustion engine of a vehicle. The control system includes an intake port of a cylinder head for an engine main body, a throttle body having a throttle valve and connected to the intake port, an electric actuator having an electric motor and arranged on the throttle body to drive open or close the throttle valve, and a connector disposed on a housing of the electric actuator in a position facing toward one axial end of a crankshaft. The connector is provided in order to connect to an outside conductor to the electric motor of the electric actuator. The resulting configuration facilitates the work to connecting the outside conductor to the connector.

17 Claims, 9 Drawing Sheets

AIR INTAKE CONTROL SYSTEM FOR INTERNAL COMBUSTION ENGINE OF A VEHICLE

CROSS-REFERENCE TO RELATED APPLICATION

The present application claims priority under 35 U.S.C. §119 to Japanese Patent Application No. 2006-269405, filed Sep. 29, 2006, the entire contents of which are hereby incorporated by reference.

BACKGROUND OF THE INVENTION

1. Field of the Invention

This invention relates to an air intake control system (electronic throttle, DBW) for an internal Combustion engine of a vehicle, in which a throttle body having a throttle valve is connected to an intake port of a cylinder head which an engine main body is provided with, and an electric actuator having an electric motor is arranged on the throttle body to drive open or close the throttle valve.

2. Description of Background Art

An air intake control system in which an electronic actuator having an electric motor is mounted on a throttle body to drive open or close a throttle valve is already known, for example, from Japanese Patent No. 3536612, for example.

A connector is arranged on a housing of an electric actuator to connect an outside conductor to an electric motor which an electric actuator is provided with. It is, hence, desired to permit easy connecting work of the outside connector to the connector in a state that a throttle body has been assembled on an internal combustion engine. In Japanese Patent No. 3536612 referred to in the above, however, no consideration is made about the arrangement of a connector and no disclosure is found about the arrangement of a connector.

With the foregoing circumstances in view, the present invention has as an object thereof the provision of an air intake control system for an internal Combustion engine of a vehicle, which facilitates connecting work of an outside conductor to a connector of an electric actuator arranged on a throttle body.

SUMMARY AND OBJECTS OF THE INVENTION

To achieve the above-described object, according to a first aspect of the invention, in an air intake control system for an internal Combustion engine of a vehicle, said system including an intake port of a cylinder head which an engine main body is provided with, a throttle body having a throttle valve and connected to the intake port, and an electric actuator having an electric motor and arranged on the throttle body to drive open or close the throttle valve, a connector disposed on a housing of the electric actuator to connect an outside conductor to the electric motor is arranged facing toward one axial end of a crankshaft.

According to a second aspect of the invention, the engine main body is mounted on a body frame with a cylinder axis inclined forwardly and upwardly or rearwardly and upwardly along an advancing direction of the vehicle, and the throttle body is arranged lower than a top end of a head cover connected to the cylinder head.

According to a third aspect of the invention, a direction of the connector is set substantially in parallel with a bottom wall of an air cleaner arranged above the electric actuator.

According to a fourth aspect of the invention, the connector is disposed on the housing as a common connector for at least the electric motor and a sensor for detecting an opening of the throttle.

The effects of the invention include the following:

According to the first aspect of the invention, the connector of the electric actuator is directed toward the one axial end of the crankshaft. Therefore, upon performing connecting work of the outside conductor to the connector, the engine main body does not lie in the way so that the connecting work is facilitated and wiring is also facilitated.

According to the second aspect of the invention, it is possible to arrange the throttle body at as low a position as possible so that the entire internal combustion engine can be constructed in a compact size.

According to the third aspect of the invention, the outer conductor to be connected to the connector can be arranged at a position close to the air cleaner without any interference with the air cleaner and also in close proximity with the side of the engine main body, thereby contributing to an overall size reduction of the internal combustion engine.

According to the fourth aspect of the invention, a single common connector is used for plural electric parts including at least the electric motor and the sensor. Compared with the use of plural connectors, it is possible to decrease the number of parts, and hence to achieve a cost reduction and to facilitate the wiring.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

FIG. 1 through FIG. 9 show a first embodiment of the invention.

Figure 1:
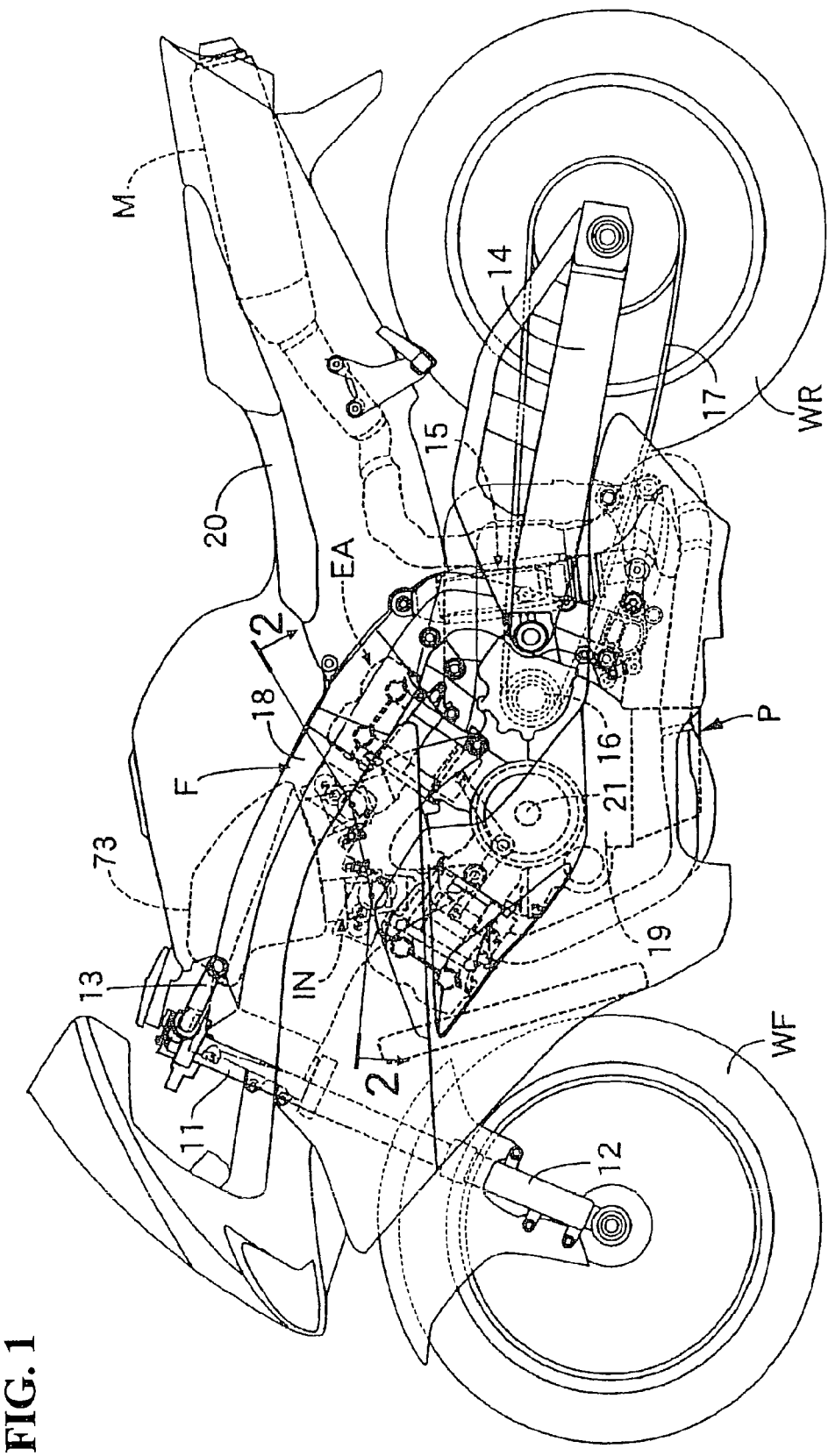
FIG. 1 is a side view of a motorcycle.

Referring first to FIG. 1, through a head pipe 11 which a body frame F of a motorcycle as a vehicle is provided with at a forward thereof, a front fork 12 with a front wheel WF rotatably supported thereon is steerably used. A steering bar 13 is connected to an upper part of the front fork 12. Further, a rear fork 14 with a rear wheel WR rotatably supported thereon is supported rockably up and down on the body frame F. This rear fork 14 is suspended from the body frame F via a suspension means 15.

On the vehicle frame F between the front wheel WF and the rear wheel WR, an internal combustion engine EA—which is, for example, a four-cylinder V-type internal combustion engine—and a power unit P including an unillustrated transmission are mounted. To an output shaft 16 of the power unit P, the rear wheel WR is interlockingly connected via a chain transmission mechanism 17.

Figure 2:
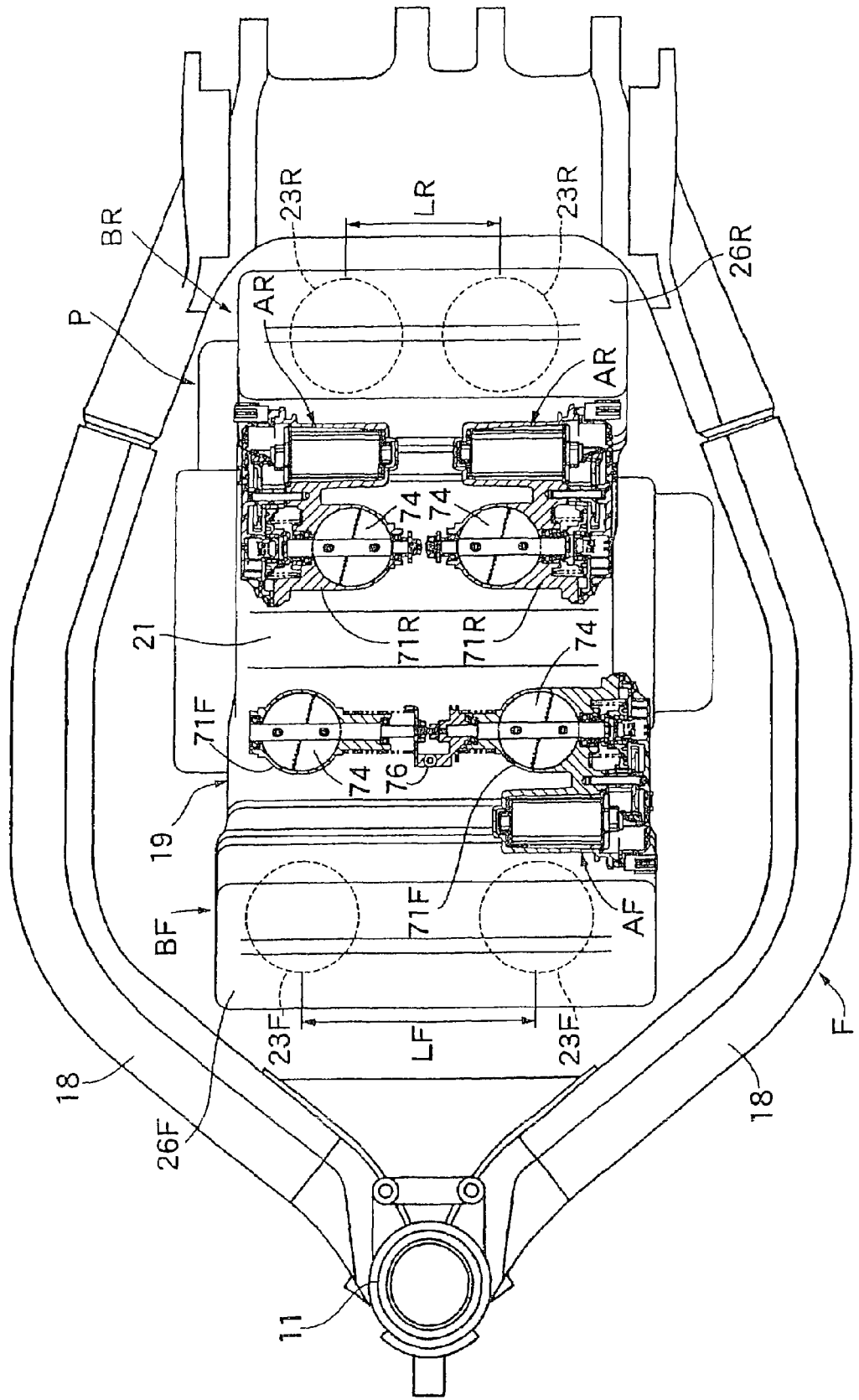
FIG. 2 is a cross-sectional view taken along line 2-2 of FIG. 1.

With reference to FIG. 2, the body frame F has a pair of main frames 18,18 parting right and left from the head pipe 11 and extending rearwardly and downwardly. These main frames 18,18 are curved such that they bulge out in right and left directions, respectively. An engine main body 19 of the internal combustion engine EA is disposed between the main frames 18,18, and a rider's seat 20 is mounted on the body frame F such that the rider's seat is arranged rearward and above the engine main body 19.

Figure 3:
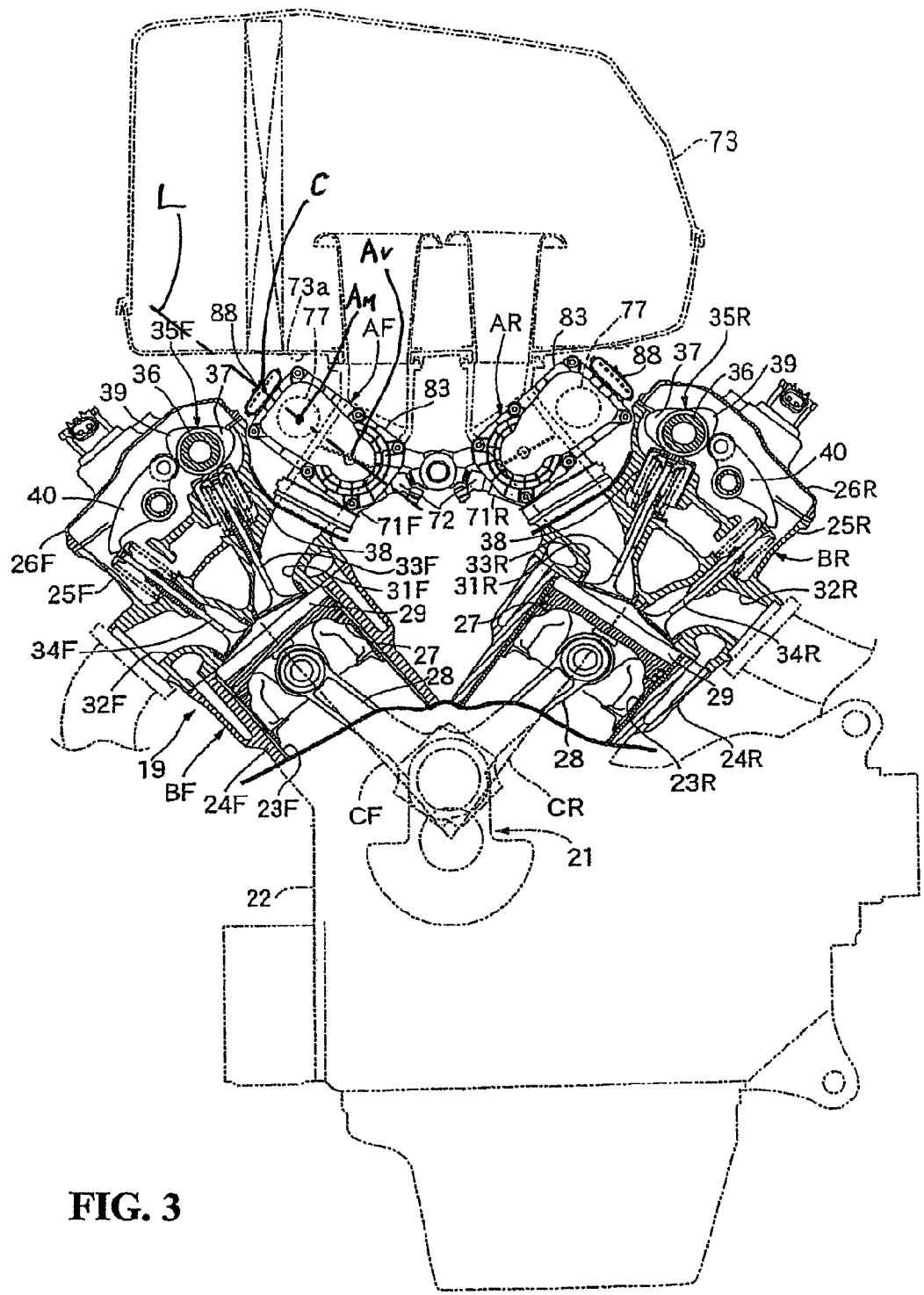
FIG. 3 is a vertical cross-sectional side view of an engine main body.

Referring also to FIG. 3, the engine main body 19 is constructed as a V-type with a front bank BF and rear bank BR that form a substantially V-shape. The front and rear banks BF, BR are each provided with two cylinders arranged side by side in a direction transverse to the vehicle frame F. Lower parts of the front bank BF and rear bank BR are commonly connected to a crankcase 22 which rotatably supports a crankshaft 21 having a horizontal axis line extending at right angles to an advancing direction of the motorcycle. When the air intake control system in viewed in side elevation view, an imaginary straight line L extending orthogonally from an axis $A_v$ of the valve shaft 75 can be seen to pass through an axis $A_m$ of the electric motor 77 and a center portion C of the connecter 88.

The front bank BF is equipped with a cylinder block 24F defining therein a pair of cylinder bores 23F, 23F having a cylinder axis line CF inclined forwardly and upwardly, a cylinder head 25F connected to the cylinder block 24F, and a head cover 26F connected to the cylinder head 25F, while the rear bank BR is equipped with a cylinder block 24R defining therein a pair of cylinder bores 23R, 23R having a cylinder axis line CR inclined rearwardly and upwardly, a cylinder head 25R connected to the cylinder block 24R, and a head cover 26R connected to the cylinder head 25R. Further, pistons 27 slidably fitted in the respective cylinder bores 23F, 23F, 23R, 23R of the front and rear banks BF,BR are commonly connected to the crankshaft 21 via connecting rods 28, respectively.

As illustrated in FIG. 2, a distance LF between the respective cylinder bores 23F, 23F in the front bank BF is, therefore, set greater than a distance LR between the respective cylinder bores 23R, 23R in the rear bank BR.

Between the cylinder blocks 24F, 24R and the cylinder heads 25F, 25R in the front and rear banks BF, BR, combustion chambers 29 are formed corresponding to the respective cylinders such that head portions of the corresponding pistons 27 face the combustion chambers, respectively. Through the cylinder head 25F of the front bank BF, intake ports 31F and exhaust ports 32F are formed such that they can be brought into communication with the corresponding combustion chambers 29. The intake ports 31F open in a rear side wall of the cylinder head 25F such that they face a V-shaped space formed between the front bank BF and the rear bank BR, while the exhaust ports 32F open in a front side wall of the cylinder head 25F. Through the cylinder head 25R of the rear bank BR, on the other hand, the intake ports 31R and exhaust ports 32R are formed such that they can be brought into communication with the corresponding combustion chambers 29. The intake ports 31R open in a front side wall of the cylinder head 25R such that they face the V-shaped space, while the exhaust ports 32R open in a rear wall of the cylinder head 25R.

Between the cylinder head 25F and head cover 26F in the front bank BF, a valve actuator 35F is accommodated to drive open or close intake valves 33F and exhaust valves 34F arranged corresponding to the respective cylinders in the cylinder head 25F such that the intake valves and exhaust valves can be operated open or close. Between the cylinder head 25R and head cover 26R in the rear bank BR, on the other hand, a valve actuator 35R is accommodated to drive open or close intake valves 33R and exhaust valves 34R arranged corresponding to the respective cylinders in the cylinder head 25R such that the intake valves and exhaust valves can be operated open or close.

The valve actuators 35F, 35R are, therefore, provided with camshafts 36, 36 to which rotary power is transmitted at a reduction ratio of ½ from the crankshaft 21 via corresponding unillustrated timing transmitting devices; valve lifters 38 interposed between intake-side valve cams 37 arranged on the camshafts 36, 36 and the intake valves 33F, 33F, 33R, 33R and slidably fitted in the cylinder heads 25F, 25R, respectively; and rocker arms 40 arranged between exhaust-side valve cams 39 disposed on the camshaft 36, 36 and exhaust valves 34F, 34F, 34R, 34R such that the rocker arms 40 can be rocked by exhaust-side valve cams 39, respectively.

It is to be noted that the valve actuator 35F for all the cylinders in the front bank BF is constructed to operate full time during an operation of the engine while the valve actuator 35R for all the cylinders in the rear bank BR is constructed to be able to take a cylinder-deactivating state.

Figure 4:
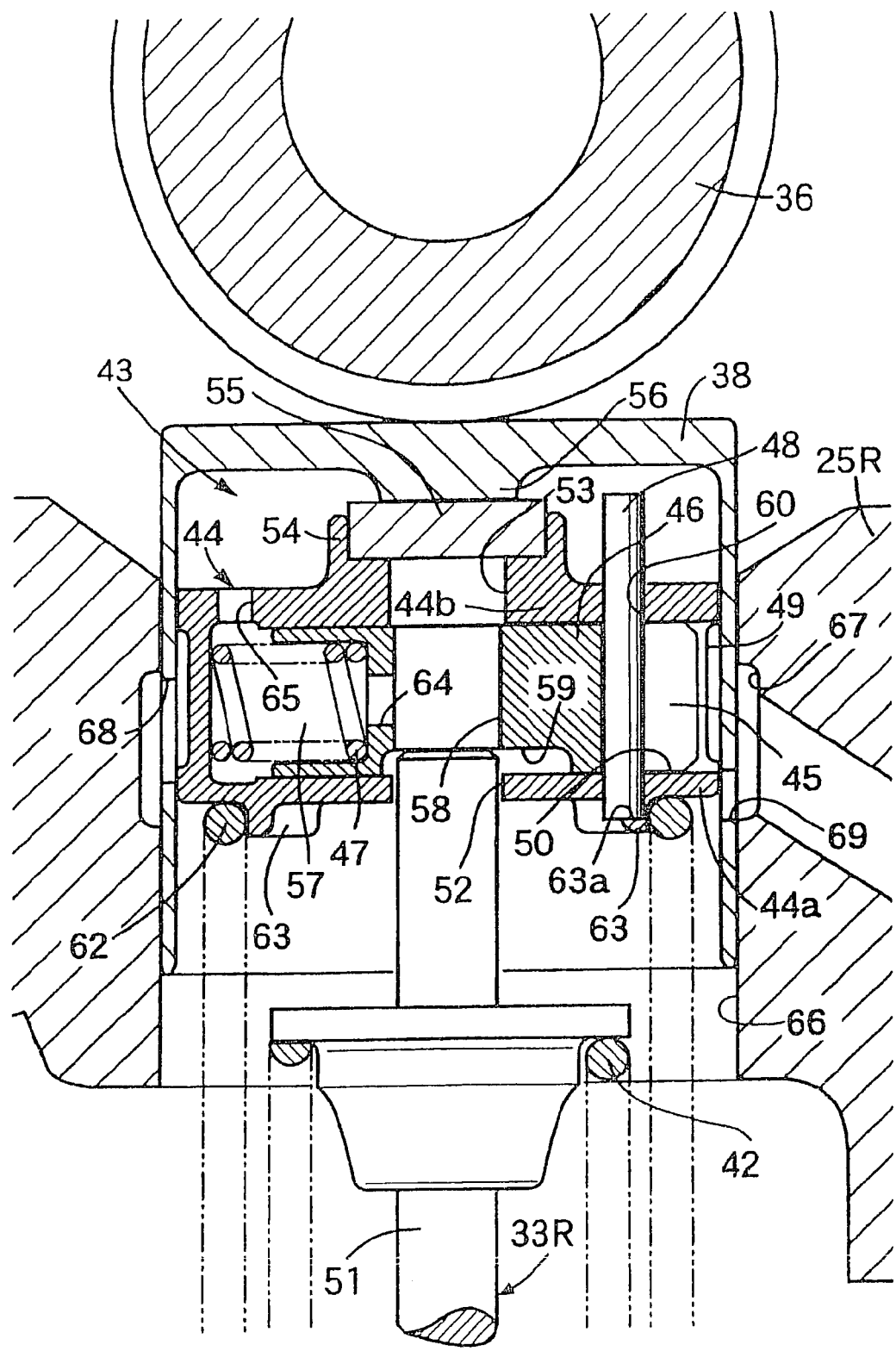
FIG. 4 is vertical cross-sectional view of a hydraulic valve-deactivating mechanism.

In FIG. 4, the valve actuator 35R in the rear bank BR is provided with a hydraulic valve-deactivating mechanism 43. This hydraulic valve-deactivating mechanism 43 is equipped with a pin holder 44 slidably fitted in a valve lifter 38, a slide pin 46 forming a hydraulic chamber 45 between itself and an inner wall of the valve lifter 38 and slidably fitted in the pin holder 44, a return spring 47 arranged between the slide pin 46 and the pin holder 44 to produce spring force that biases the slide pin 46 in a direction to reduce the volume of the hydraulic chamber 45, and a stopper pin 48 arranged between the pin holder 44 and the slide pin 46 to prevent the slide pin 46 from turning about its axis line.

Figure 5:
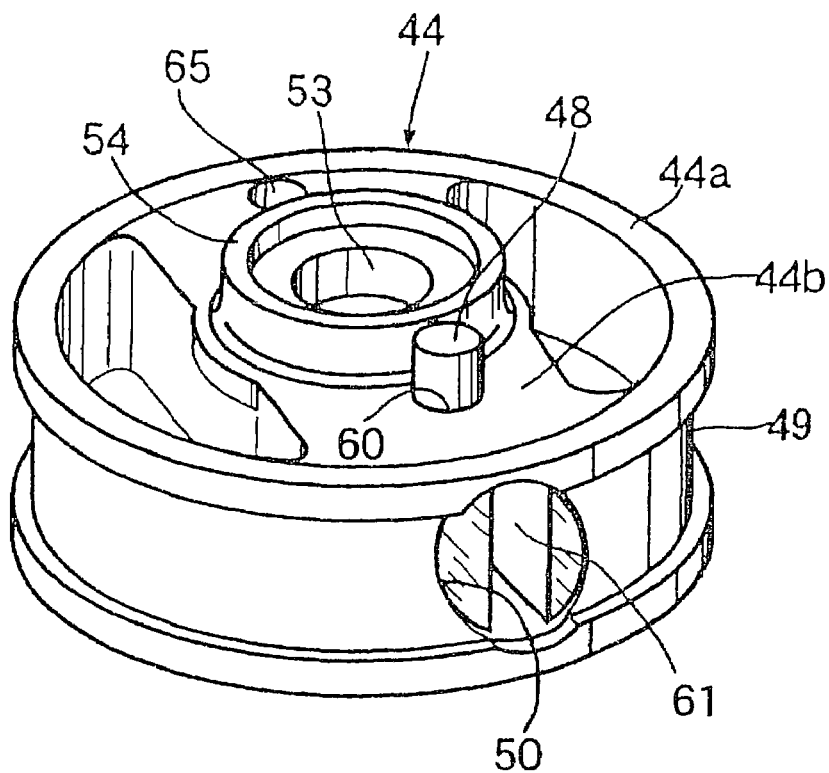
FIG. 5 is a perspective view of a pin holder as viewed from above.
Figure 6:
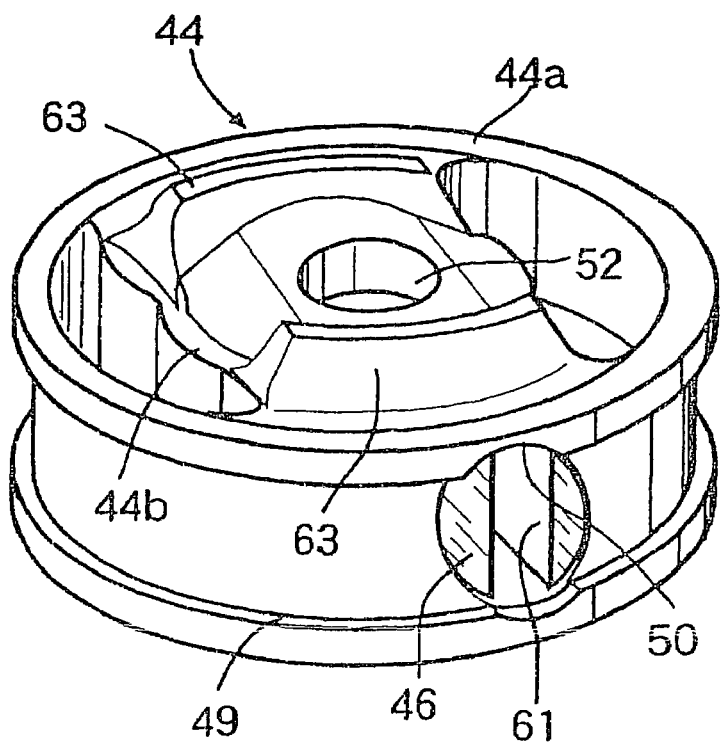
FIG. 6 is a perspective view of a pin holder as viewed from below.

Referring to FIG. 5 and FIG. 6 in combination, the pin holder 44 is integrally equipped with a ring portion 44a slidably fitted in the valve lifer 38 and a bridge portion 44b connecting together diametrically-opposite two points on an inner circumference of the ring portion 44a along one diametric line. Between the inner circumference of the ring portion 44a and respective side walls of the bridge portion 44b, excess metal is cut away to achieve a weight reduction.

On an outer circumference of the pin holder 44, specifically on an outer circumference of the ring portion 44a, an annular groove 49 is formed. Formed through the bridge portion 44b of the pin holder 44 is a bottomed slide hole 50, which has an axis line extending along the one diametric line of the ring portion 44a, in other words, extending at right angles to an axis line of the valve lifter 38, is open at one end thereof in the annular groove 49, and is closed at an opposite end thereof. The bridge portion 44b is provided at a central lower part thereof with an insertion opening 52 such that its inner end opens in the slide hole 50. The insertion opening 52 allows a free end portion of a valve stem 51 of an intake valve 33R to extend therethrough when the intake valve 33R is biased in a valve-closing direction by a valve spring 42. In a central upper part of the bridge portion 44b, on the other hand, an extension hole 53 with the slide hole 50 located between itself and the insertion hole 52 is formed coaxially with the insertion hole 52 such that the extension hole 53 can accommodate the free end portion of the valve stem 51 of the intake valve 33R.

At a part facing a closed end of the valve lifter 38, the bridge portion 44b of the pin holder 44 is integrally provided with a receiving cylindrical portion 54 which is coaxial with an axis line of the extension hole 53, and a portion of a disk-shaped shim 55, which closes an end portion of the extension hole 53 on the side of the closed end of the valve lifter 38, is fitted in the receiving cylindrical portion 54. Moreover, the inner wall of the closed end of the valve lifter 38 is integrally provided at a central part thereof with a raised portion 56 which is in contact with the shim 55.

The slide pin 46 is slidably fitted in the slide hole 50 of the pin holder 44. Between an end of the slide pin 46 and the inner wall of the valve lifter 38, the hydraulic chamber 45 is formed in communication with the annular groove 49. The return spring 47 is accommodated in a spring chamber 57 formed between the other end of the slide pin 46 and the closed end of the slide hole 50.

Figure 7:
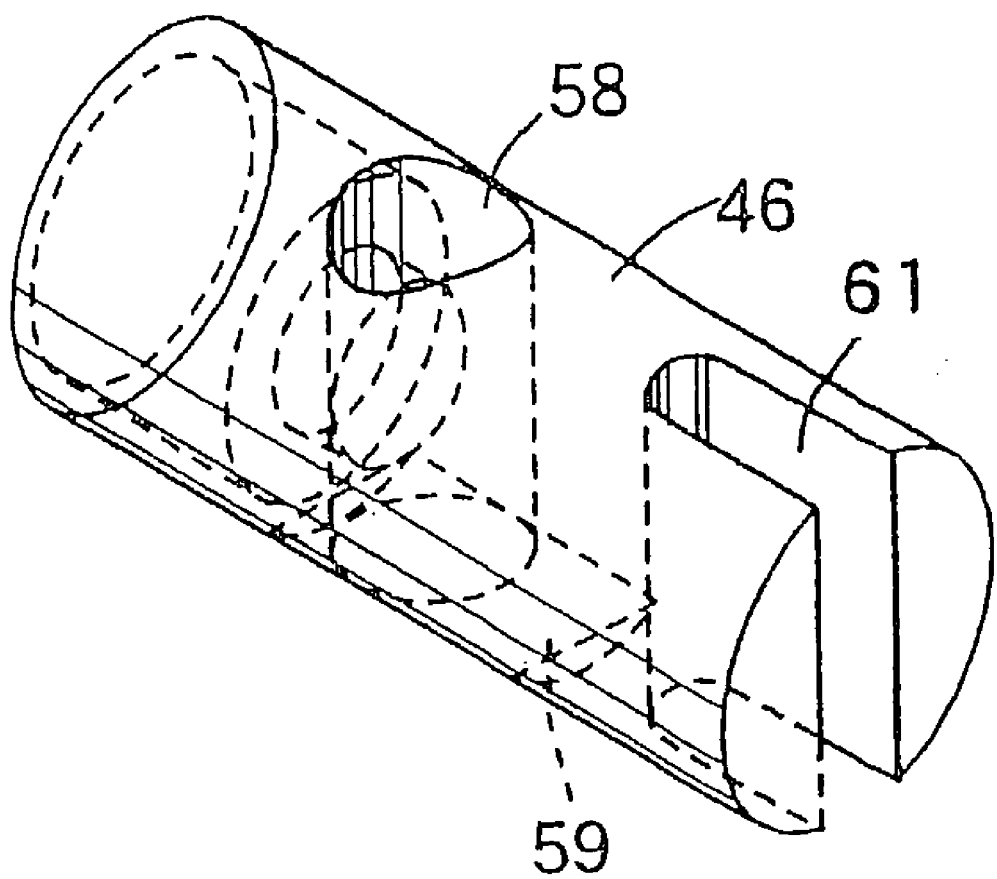
FIG. 7 is a perspective view of a slide pin.

Also referring to FIG. 7, the slide pin 46 is provided in an axial intermediate portion thereof with a receiving hole 58 such that the receiving hole 58 can receive the free end portion of the valve stem 51. This receiving hole 58 can extend coaxially with the insertion opening 52 and extension hole 53. An end portion of the receiving hole 58 on the side of the insertion opening 52 opens in a flat contact wall 59, which is formed on an outer wall of a lower portion of the slide pin 46 at a location opposite the insertion opening 52. Accordingly, the contact wall 59 is formed relatively long along the direction of an axis line of the slide pin 46, and the receiving hole 58 opens in the contact wall 59 at a part located on the side of the spring chamber 57.

The slide pin 46 constructed as described above axially slides such that the hydraulic force acting on the side of one end of the slide pin 46 under the hydraulic pressure in the hydraulic chamber 45 and the spring force acting on the side of the other end of the slide pin 46 by the return spring 47 balance each other. At the time of non-operation that the hydraulic pressure of the hydraulic chamber 45 is low, the slide pin 46 moves rightward as viewed in FIG. 4 so that the free end portion of the valve stem 51, which has inserted into the insertion opening 52, is received in the receiving hole 58 and extension hole 53. In an operation state that the hydraulic pressure of the hydraulic chamber 45 has arisen to a high pressure, on the other hand, the slide pin 46 moves leftward as viewed in FIG. 4 such that the axis line of the receiving hole 58 is bought into a misalignment with those of the insertion opening 52 and extension hole 53 and the free end of the valve stem 51 is brought into contact with the contact wall 59.

When the slide pin 46 has moved to the position where the receiving hole 58 extends coaxially with the insertion opening 52 and extension hole 53, the pin holder 44 and slide pin 46 also move together with the valve lifter 38 toward the intake valve in response to sliding of the valve lifter 38 under pressing force acting on the intake-side valve cam 37. This, however, simply results in the reception of the free end portion of the valve stem 51 in the receiving hole 58 and extension hole 53, and no pressing force acts in the valve-opening direction on the intake valve 33R from the valve lifter 38 and pin holder 44 so that the intake valve 33R remains deactivated. When the slide pin 46 has moved to the position where its contact wall 59 comes into contact with the free end portion of the valve stem 51, on the other hand, pressing force acts in the valve-opening direction on the intake valve 33R as a result of a movement of the pin holder 44 and slide pin 46 toward the intake valve 33R in response to sliding of the valve lifter 38 under pressing force acting from the intake-side valve cam 37. The intake valve 33R is, therefore, operated open or close responsive to rotation of the intake-side valve cam 37.

When the slide pin 46 turns about its axis line within the pin holder 44, a misalignment takes place between the axis line of the receiving hole 58 and those of the insertion opening 52 and extension hole 53, and further, it becomes impossible to bring the free end portion of the valve stem 51 into contact with the contact wall 59. The slide pin 46 is, therefore, prevented from turning about its axis line by the stopper pin 48.

The stopper pin 48 is fixed in fixing bores 60 arranged coaxially in the bridge portion 44b of the pin holder 44 such that the slide hole 50 is located at one end portion thereof between the fixing bores 60. The stopper pin 48 extends through a slit 61 formed on one end of the slide pin 46 such that the slit 61 opens toward the hydraulic chamber 45. The stopper pin 48 is, therefore, fixed on the pin holder 44 such that it extends through the slide pin 46 while allowing the sliding pin 46 to move in the direction of its axis line. By a contact of the stopper pin 48 with a closed inner end portion of the slit 61, the slide pin 46 is also limited from moving toward the hydraulic chamber 45.

A coil spring 62, which biases the pin holder 44 toward the side that the shim 55 fixed on the pin holder 44 is brought into contact with the raised portion 56 arranged on the central part of the inner wall of the closed end of the valve lifter 38, is arranged between the pin holder 44 and the cylinder head 25R such that the coil spring 62 surrounds the valve stem 51 at a position where an outer circumference of the coil spring 62 is prevented from coming into contact with the inner wall of the valve lifter 38. On the bridge portion 44b of the pin holder 44, a pair of ridges 63,63 are integrally arranged to position an upper end portion of the coil spring 62 in a direction perpendicular to the axis line of the valve stem 51.

Moreover, both of the ridges 63, 63 are integrally arranged on the pin holder 44 with an extent of protrusion not greater than the wire diameter of the coil spring 62, and are formed in the shape of circular arcs centering about the axis line of the valve stem 51.

On one of the ridges 63, 63, a stepped portion 63a is formed such that the stepped portion 63a comes into contact with an end portion of the stopper pin 48, said end portion being on the side of the intake valve 33R, to prevent the stopper pin 48 from moving toward the intake valve 33R.

The slide pin 46 is provided with a communication hole 64, which keeps the spring chamber 57 in communication with the receiving hole 58 to prevent pressurization or depressurization of the spring chamber 57 by a movement of the slide pin 46 in the axial direction thereof. The pin holder 44 is provided with a communication hole 65, which keeps the above-described space in communication with the spring chamber 57 to prevent the pressure in the space between the pin holder 44 and the valve lifter 38 from varying by a change in temperature.

The cylinder head 25R is provided with a support bore 66 in which the valve lifter 38 is fitted to slidably support the valve lifter 38. On an inner wall of the support bore 66, an annular recess 67 is formed surrounding the valve lifter 38. The valve lifter 38, on the other hand, is provided with a communication hole 68, which maintains the annular recess 67 in communication with the annular groove 49 of the pin holder 44 irrespective sliding movements of the valve lifter 38 in the support bore 66. The valve lifter 38 is also provided with a release hole 69. This release hole 69 is formed through the valve lifter 38 at such a position that, when the valve lifter 38 has moved to a highest level as shown in FIG. 4, the release hole 69 brings the annular recess 67 into communication with the inside of the valve lifter 38 at a level lower than the pin holder 44 but the communication with the annular recess 67 is cut off as the valve lifter 38 moves downward from the highest level depicted in FIG. 4. Through this release hole 69, working oil is injected into the valve lifter 38.

Referring back to FIG. 3 again, throttle bodies 71F, 71F are connected to the intake ports 32F, 32F in the cylinder head 25F of the front bank BF, respectively; throttle bodies 71R, 71R are connected to the intake ports 32R, 32R in the cylinder head 25R of the rear bank BR, respectively; and the respective throttle bodies 71F, 71F, 71R, 71F are provided with fuel injection valves 72 to inject fuel toward the intake ports 32F, 32F, 32R, 32R, respectively. The throttle bodies 71F, 71F on the side of the front bank BF and the throttle bodies 71R, 71R on the side of the rear bank BR are commonly connected to an air cleaner 73 arranged above the throttle bodies 71F, 71F, 71R, 71R.

Figure 8:
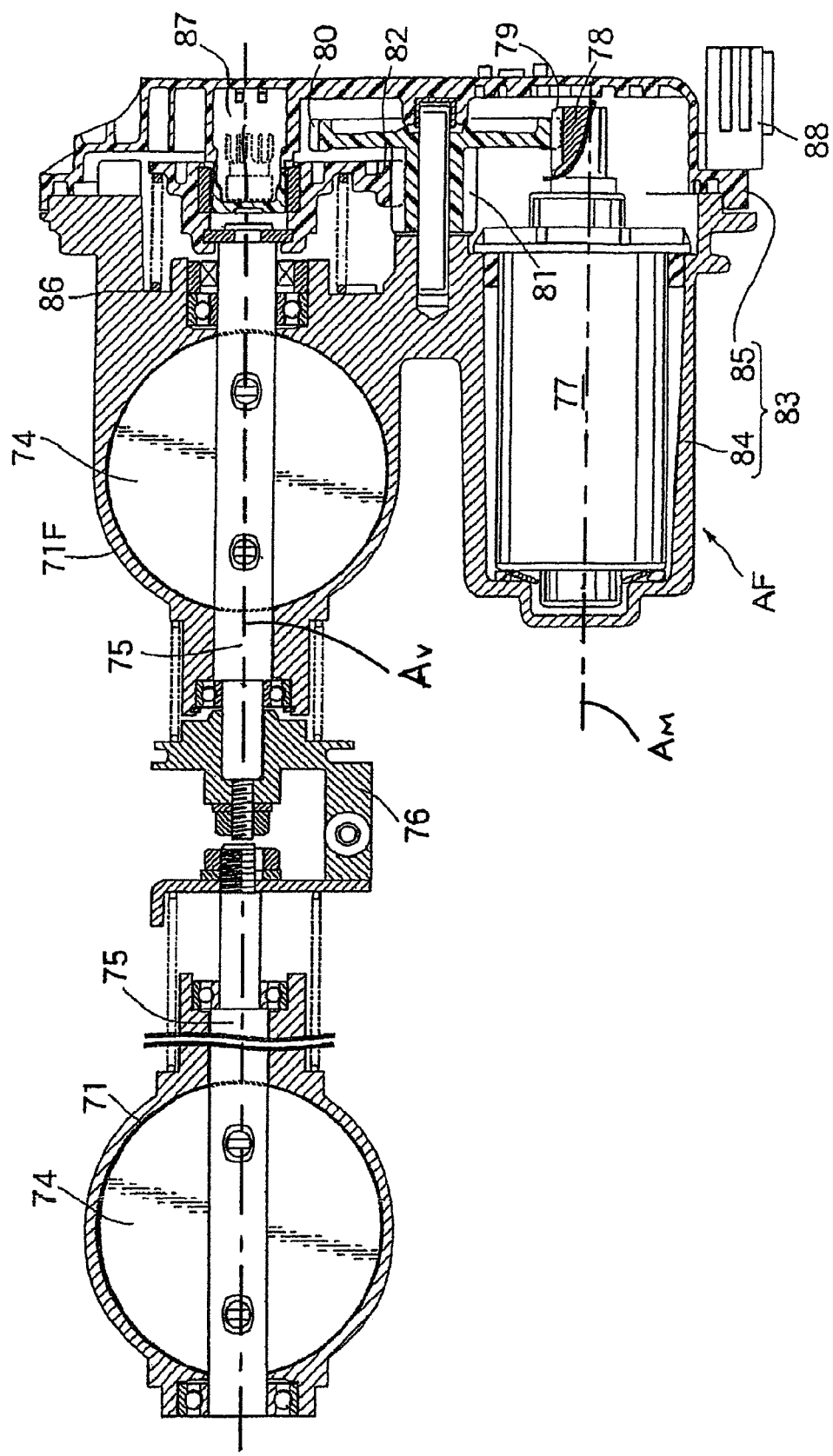
FIG. 8 is a transverse cross-sectional view of a throttle body on a side of a front bank.

In FIG. 8, throttle valves 74, 74 in the two throttle bodies 71F, 71F on the side of the front bank BF are rotationally controlled together, because valve shafts 75, 75 on which these throttle valves 74, 74 are fixed are connected together by a connecting member 76. A single electric actuator AF, which is common to both of the throttle bodies 71F, 71F, is fixed on one of the throttle bodies 71F, 71F.

This electric actuator AF is constructed of an electric motor 77 having a axis line of rotation perpendicular to the valve shaft 75, a drive pinion 79 arranged on an output shaft 78 of the electric motor 77, a large-diameter intermediate gear 80 arranged in meshing engagement with the drive pinion 79, a small-diameter intermediate gear 81 rotatable integrally with the large-diameter intermediate gear 80, and a driven sector gear 82 fixed on the valve shaft 75 and arranged in meshing engagement with the small-diameter intermediate gear 81. A housing 83 which accommodates the electric actuator AF is constructed of a housing-forming section 84 integral with the throttle body 71F and a cover member 85 made of a synthetic resin and connected to the housing-forming section 84.

In addition, a return spring 86 is arranged between the throttle body 71F and the driven sector gear 82 in the housing 83. The return spring 86 exhibits spring force in a direction that the throttle valves 74 are returned to the full-close positions, respectively. On the cover member 85, a sensor 87 for detecting a rotated position of the valve shaft 75, in other words, an opening of the throttle valve 74 is attached such that the sensor 87 faces an end face of the valve shaft 75. As can be seen in FIGS. 3 and 8, when the air intake control system in viewed in side elevation view, an imaginary straight line L extending orthogonally from an axis $A_v$ of the valve shaft 75 can be seen to pass though an axis $A_m$ of the electric motor 77 and a center portion C of the connecter 88.

Figure 9:
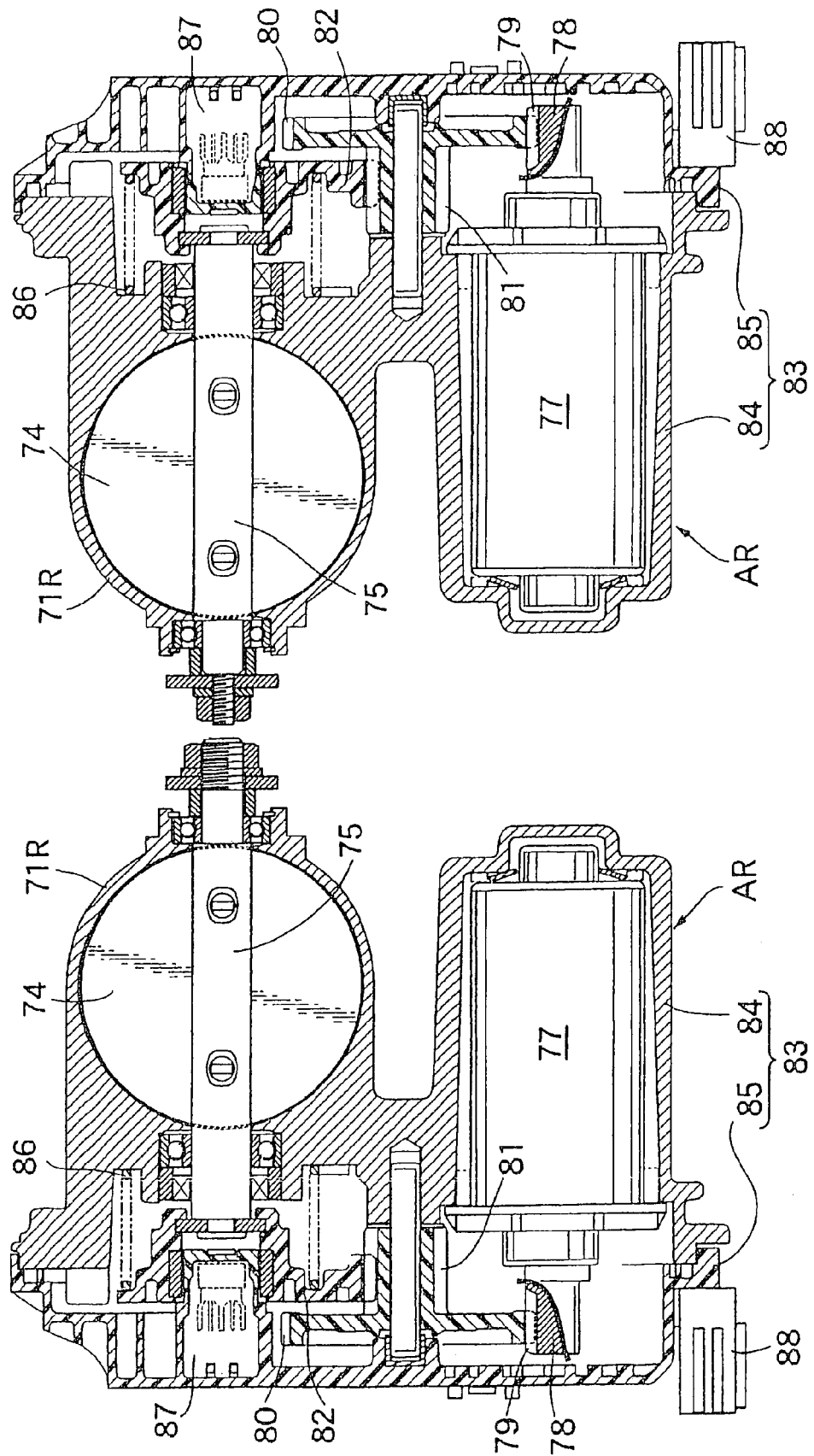
FIG. 9 is a transverse cross-sectional view of a throttle body on a side of a rear bank.

In FIG. 9, the throttle bodies 71R, 71R on the side of the rear bank BR are individually provided with electric actuators AR, AR to control cylinder by cylinder the amount of air intake. Moreover, the throttle bodies 71R, 71R and electric actuators AR, AR have the same constructions as the throttle bodies 71F, 71F on the side of the front bank BF and the electric actuator AF, respectively. Therefore, elements corresponding to the throttle bodies 71F, 71F and electric actuator AF on the side of the front bank BF are illustrated only in the figure by applying the same reference numerals to the corresponding elements, and their detailed description is omitted.

The cover members 85, 85, 85 in the housings 83, 83, 83 of the respective electric actuators AF, AR, AR are provided with connectors 88, 88, 88 to connect outside conductors to at least the electric motors 77, 77, 77, respectively. In this example, the connectors 88, 88, 88, which are common to the electric motors 77, 77, 77 and the sensors 87, 87, 87, respectively, are arranged on the cover members 85, 85, 85 so that outside conductors can be connected to them, respectively. As shown clearly in FIG. 3, these connectors 88, 88, 88 are arranged such that they are located above the engine main body 19, are directed toward an axial one end of the crankshaft 21, and lie substantially in parallel with the bottom wall 73a of the air cleaner 73 disposed above the electric actuators AF, AR, AR.

A description will next be made about the operation of the first example. The connectors 88, 88, 88 disposed on the housings 83, 83, 83 of the respective electric actuators AF, AR, AR—which are fixed on the throttle bodies 71F, 71F, 71R, 71R connected to the respective intake ports 32F, 32F, 32R, 32R in the cylinder heads 25F, 25R which the front and rear banks BF, BR in the engine main body 19 are provided with—are arranged to face the axial one end of the crankshaft 21. Therefore, upon performing connecting work of the outside conductors to the connectors 88, 88, 88, the engine main body 19 does not lie in the way so that the connecting work can be facilitated and the wiring can also be facilitated.

Moreover, the directions of the connectors 88, 88, 88 are set substantially in parallel with the bottom wall 73a of the air cleaner 73 arranged above the electric actuators AF, AR, AR. The outer conductors to be connected to the respective connectors 88, 88, 88 can be arranged at a position close to the air cleaner 73 without any interference with the air cleaner 73 and also in close proximity with the side of the engine main body 19, thereby contributing to an overall size reduction of the internal combustion engine EA.

The connectors 88, 88, 88 are disposed on the housings 83, 83, 83 commonly for at least the corresponding electric motors 77, 77, 77 and sensors 87, 87, 87 for detecting openings of the respective throttle valves 74, 74, 74. Compared with the use of plural connectors on each housing, it is possible to decrease the number of parts, and hence to achieve a cost reduction and to facilitate the wiring.

Furthermore, the valve actuators 35F for all the cylinders in the front bank BF are constructed to operate full time during operation of the engine, while the valve actuators 35R for all the cylinders in the rear bank BR can be brought into a cylinder-deactivated state. Upon deactivating some of the plural cylinders, the cylinders in the front bank BF, which are readily exposed to running wind, are controlled to operate full time. It is, therefore, possible to improve the cooling efficiency of the internal combustion engine EA.

Figure 10:
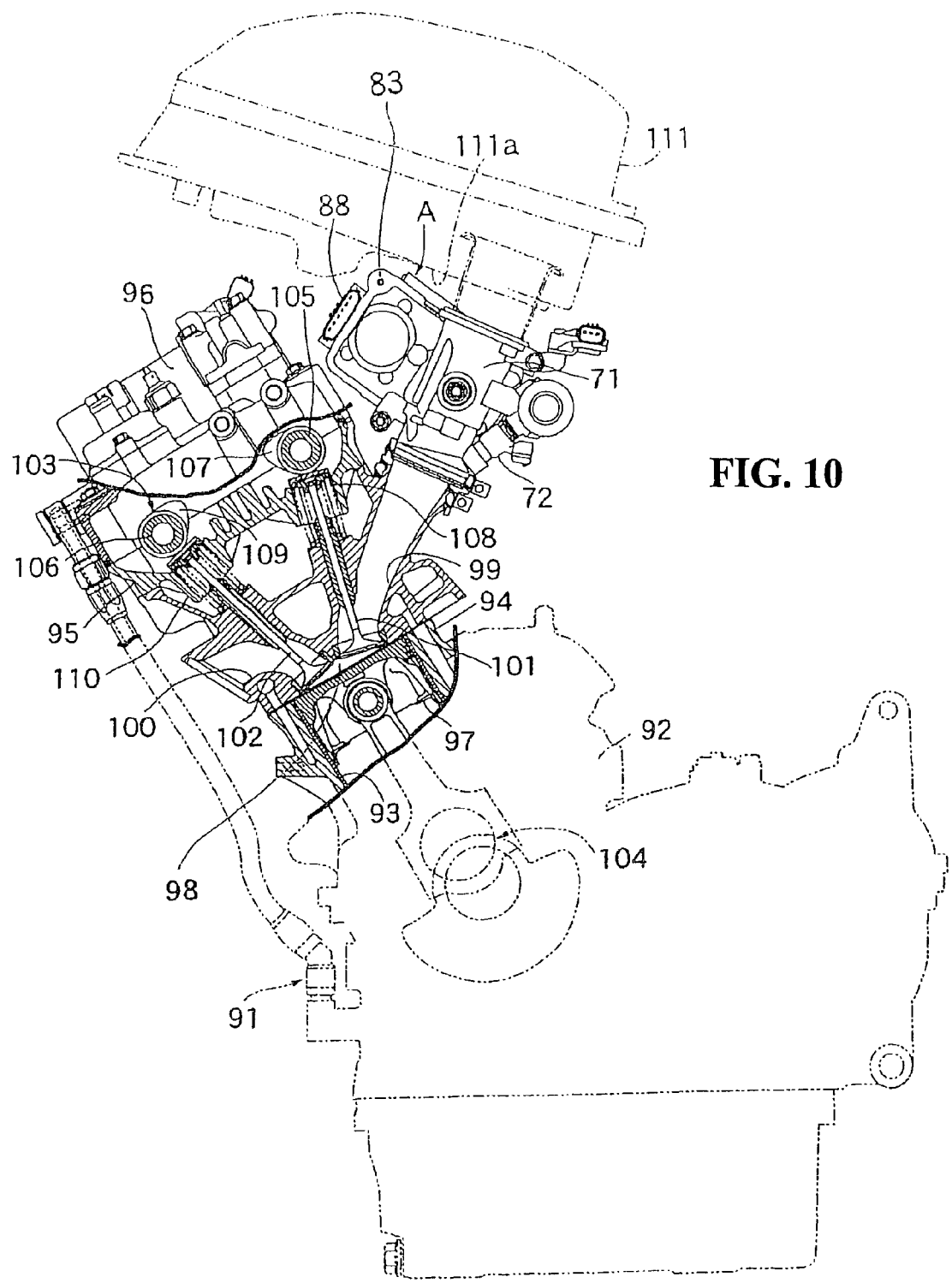
FIG. 10 is a vertical cross-sectional side view of an engine main body in a second example.

A second example of the present invention will hereinafter be described with reference to FIG. 10. An engine main body 91 of an inline multicylinder, for example, four-cylinder internal combustion engine EB is provided with a crankcase 92, a cylinder block 94 defining four cylinder bores 93 arranged side by side and connected to the crankcase 92, a cylinder head 95 connected to the cylinder block 94, and a head cover 96 connected to the cylinder head 95, and a cylinder axis line C of each cylinder bore 93 is inclined forwardly and upwardly.

Between the cylinder block 95 and the head cover 96, combustion chambers 98 are formed corresponding to the respective cylinders such that head portions of corresponding pistons 97 slidably fitted in the cylinder bores 93 face the combustion chambers 98, respectively. Through the cylinder head 95, intake ports 99 and exhaust ports 100 are formed corresponding to the respective cylinders such that they can be brought into communication with the corresponding combustion chambers 98. The intake ports 99 open in a rear side wall of the cylinder head 95, while the exhaust ports 100 open in a front side wall of the cylinder head 95.

Between the cylinder head 95 and the head cover 96, a valve actuator 103 is accommodated to drive open or close intake valves 101 and exhaust valves 102 arranged corresponding to the respective cylinders such that the intake valves 101 and exhaust valves 102 can be operated open or close. The valve actuator 103 is provided with an intake-side camshaft 105 and exhaust-side camshaft 106 to which rotary power is transmitted at a reduction ratio of ½ from the crankshaft 104 rotatably supported in the crankcase 92 via an unillustrated timing transmitting device; valve lifters 108 interposed between intake-side valve cams 107 arranged on the intake-side camshaft 105 and the intake valves 101 and slidably fitted in the cylinder head 95; and exhaust-side valve lifters 110 interposed between exhaust-side cams 109 arranged on the exhaust-side camshaft 106 and the exhaust valves 102 and slidably fitted in the cylinder head 95.

Further, the valve actuator 103 is also provided at its parts—which among the inline four cylinders, correspond to both end cylinders along the array direction of the cylinders—with similar hydraulic valve-deactivating mechanisms (not shown) as the hydraulic valve-deactivating mechanism 43 described with reference of FIG. 4 to FIG. 7 of the first embodiment, and the both end cylinders along the array direction of the cylinders can be brought into a cylinder-deactivated state by closing and deactivating the intake valves 101.

Throttle bodies 71 are connected to the intake ports 99 in the cylinder head 95; and the respective throttle bodies 71 are provided with fuel injection valves 72 to inject fuel toward the intake ports 99, respectively. The throttle bodies are commonly connected to an air cleaner 111 arranged above the throttle bodies 71.

Connectors 88 are disposed on housings 83 of electric actuators A fixed on the respective throttle bodies 71, an these connectors 8 are arranged above the engine main body 91 and facing toward an axial one end of the crankshaft 104. The directions of the connectors 88 are set substantially in parallel with a bottom wall 111a of the air cleaner 111 arranged above the electric actuators A, and moreover, the throttle bodies 71 are arranged lower than a top end of the head cover 96.

Similar to the first example described above, the second example can also avoid lying of the engine main body in the way upon performing connecting work of outside conductors to the connectors 88, so that the connecting work can be facilitated and wiring can also be facilitated. The outer conductors to be connected to the connectors 88 can be arranged at positions close to the air cleaner 111 without any interference with the air cleaner 111 and also in close proximity with the side of the engine main body 91, thereby making it possible to contribute to a size reduction of the internal combustion engine EB. In addition, the entire internal combustion engine EB can be constructed in a compact size by arranging the throttle bodies 71 at as low positions as possible.

As a further example of the present invention, the throttle bodies 71F, 71R of the first example as depicted in FIG. 1 through FIG. 9 may be arranged lower than top ends of the head covers 26F, 26R in the respective banks BF, BR. This arrangement makes it possible to arrange the throttle bodies as low positions as possible and hence to construct the entire internal combustion engine EA in a compact size. Especially with a V-shaped internal combustion engine EA, the throttle bodies 71F, 71R can be effectively arranged in the space between the banks BF and BR to construct the internal combustion engine EA in a compact size.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air intake control system for an internal combustion engine of a vehicle, said system comprising:
    an intake port of a cylinder head for an engine main body;
    a throttle with a throttle body and a throttle valve, the throttle being connected to said intake port;
    an electric actuator having an electric motor and arranged on said throttle body to drive open or close said throttle valve;
    an intermediate gear which is adapted to connect an output shaft of the electric motor to a driven gear mounted on a valve shaft of the throttle valve; and
    a connector disposed on a housing of said electric actuator to connect an outside conductor to said electric motor,
    wherein the connector, the output shaft of the electric motor, the intermediate gear, and the driven gear are arranged adjacent to each other in positions above one axial end of a crankshaft, and
    wherein when the air intake control system in viewed in side elevation view, an imaginary straight line (L) extending orthogonally from an axis ($A_v$) of the valve shaft can be seen to pass though is ($A_m$) of the electric motor and a center portion (C) of the connecter.

2. The air intake control system according to claim 1, wherein said engine main body is mounted on a body frame with a cylinder axis inclined forwardly and upwardly or rearwardly and upwardly along an advancing direction of said vehicle, and said throttle body is arranged lower than a top end of a head cover connected to said cylinder head.

3. The air intake control system according to claim 1, wherein a direction of said connector is set substantially in parallel with a bottom wall of an air cleaner arranged above said electric actuator.

4. The air intake control system according to claim 2, wherein a direction of said connector is set substantially in parallel with a bottom wall of an air cleaner arranged above said electric actuator.

5. The air intake control system according to claim 1, wherein said connector is disposed on said housing as a common connector for at least said electric motor and a sensor for detecting an opening of said throttle.

6. The air intake control system according to claim 1, wherein said connector is disposed on said housing as a common connector for at least said electric motor and a sensor for detecting an opening of said throttle,
    wherein the sensor is mounted coaxially with respect to an axis ($A_v$) of the valve shaft of the throttle valve.

7. The air intake control system according to claim 3, wherein the air cleaner is arranged such that the bottom wall thereof lies on a plane that is substantially horizontal.

8. The air intake control system according to claim 3, wherein the air cleaner is arranged such that the bottom wall thereof lies on a plane that is at an angle with respect to a horizontal plane.

9. The air intake control system according to claim 1, wherein said engine main body is mounted on a body frame with cylinder axes inclined forwardly and upwardly and rearwardly and upwardly along an advancing direction of said vehicle.

10. An air intake control system for an internal combustion engine of a vehicle, comprising:
   an intake port of a cylinder head for an engine main body;
   a throttle with a throttle body and a throttle valve, the throttle being connected to said intake port;
   an electric actuator having an electric motor and arranged on said throttle body to drive open or close said throttle valve;
   an intermediate gear which is adapted to connect an output shaft of the electric motor to a driven gear mounted on a valve shaft of the throttle valve;
   a connector disposed on a housing of said electric actuator to connect an outside conductor to said electric motor; and
   a sensor mounted coaxially with respect to the valve shaft and the driven gear for detecting an opening of said throttle,
   wherein the connector, the sensor, the output shaft of the electric motor, the intermediate gear, and the driven gear are arranged adjacent to each other in positions above one axial end of a crankshaft.

11. An air intake control system for an internal combustion engine of a vehicle, said system comprising:
   an intake port of a cylinder head for an engine main body;
   a throttle with a throttle body and a throttle valve, the throttle being connected to said intake port;
   an electric actuator having an electric motor and arranged on said throttle body to drive open or close said throttle valve;
   an intermediate gear which is adapted to connect an output shaft of the electric motor to a driven gear mounted on a valve shaft of the throttle valve, and
   a connector disposed on a housing of said electric actuator,
   wherein the connector, the output shaft of the electric motor, the intermediate gear, and the driven gear are disposed adjacent to each other in positions above one axial end of a crankshaft,
   wherein the connector is adapted to connect an outside conductor to said electric motor, and
   wherein the throttle valve includes a plurality of throttle valves, and the throttle body includes a plurality of throttle bodies, each of which houses only one of the throttle valves, the electric actuator being common to two of the plurality of throttle bodies.

12. The air intake control system according to claim 11, wherein said engine main body is mounted on a body frame with a cylinder axis inclined forwardly and upwardly or rearwardly and upwardly along an advancing direction of said vehicle, and said throttle body is arranged lower than a top end of a head cover connected to said cylinder head.

13. The air intake control system according to claim 11, wherein a direction of said connector is set substantially in parallel with a bottom wall of an air cleaner arranged above said electric actuator.

14. The air intake control system according to claim 11, wherein when the air intake control system in viewed in side elevation view, an imaginary straight line (L) extending orthogonally from an axis ($A_v$) of the valve shaft can be seen to pass though an axis ($A_m$) of the electric motor and a center (C) of the connecter.

15. The air intake control system according to claim 11, wherein said connector is disposed on said housing as a common connector for at least said electric motor and a sensor for detecting an opening of said throttle.

16. The air intake control system according to claim 11, wherein said connector is disposed on said housing as a common connector for at least said electric motor and a sensor for detecting an opening of said throttle,
   wherein the sensor is mounted coaxially with respect to an axis ($A_v$) of the valve shaft of the throttle valve.

17. The air intake control system according to claim 13, wherein the air cleaner is arranged such that the bottom wall thereof lies on a plane that is substantially horizontal.

* * * * *